United States Patent
Cai

(10) Patent No.: US 8,218,528 B2
(45) Date of Patent: Jul. 10, 2012

(54) GATEWAY PROVIDING THIRD PARTY CALL CONTROL

(75) Inventor: Yuan Cai, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1546 days.

(21) Appl. No.: 11/456,022

(22) Filed: Jul. 6, 2006

(65) Prior Publication Data

US 2008/0037516 A1  Feb. 14, 2008

(51) Int. Cl.
*H04L 12/66* (2006.01)
*H04L 12/28* (2006.01)

(52) U.S. Cl. .......................... 370/352; 370/392; 370/401

(58) Field of Classification Search .......... 370/260–262, 370/352–356, 401, 312, 349, 389, 392, 432, 370/471; 379/202.01
See application file for complete search history.

(56) References Cited

U.S. PATENT DOCUMENTS

| 2001/0030958 A1* | 10/2001 | Kichise | 370/352 |
| 2004/0076145 A1* | 4/2004 | Kauhanen et al. | 370/352 |
| 2006/0120356 A1* | 6/2006 | Lee et al. | 370/352 |
| 2007/0025270 A1* | 2/2007 | Sylvain | 370/254 |
| 2007/0115932 A1* | 5/2007 | Yang | 370/352 |
| 2007/0201688 A1* | 8/2007 | Bennett | 379/413.03 |

OTHER PUBLICATIONS

J. Rosenberg, et al., "Best Current Practices for Third Party Call Control in the Session Initiation Protocol", RFC 3725, Apr. 2004, pp. 1-29.

* cited by examiner

*Primary Examiner* — Melanie Jagannathan
*Assistant Examiner* — Joel Hamel
(74) *Attorney, Agent, or Firm* — Stolowitz Ford Cowger LLP

(57) ABSTRACT

In one embodiment, a gateway orchestrates a call between an IP device and a PSTN device. As a result, third party call control features such as Click-to-Dial together with various call features in operator services and conferencing service are available for the call with the PSTN device.

15 Claims, 4 Drawing Sheets

Background

GATEWAY PROVIDING THIRD PARTY CALL CONTROL

BACKGROUND OF THE INVENTION

This invention relates generally to communications and more particularly to third party initiated calls.

Third party call control involves one or more network devices, generally referred to as call controllers, initiating and managing a call between two endpoints. Third party initiated calls are advantageous over endpoint initiated calls because the call controller may provide value-added features such as conference center, which may be used to route a call originating from an IP phone to a 1-800 number to a predetermined call agent.

Other desirable services and features require third party call control, such as Click-to-Dial. Click-to-Dial allows a person to use a webpage to specify a call between two Session Initiation Protocol (SIP) capable devices such as two Internet Protocol (IP) phones, an IP phone and an IP host, or two IP hosts. The user, who may or may not be located at any of the called endpoints, uses the webpage to specify endpoints to be called and then clicks to initiate the call. A web server converts that click to a third party call request. A call controller then initiates a third party call to connect the endpoints upon receiving the request.

FIG. 1 illustrates a third party initiated call between two SIP capable IP phones A and B. Call controller 1 receives a Click-to-Dial request 2 specifying a call between IP phones A and B. Next, call controller 1 exchanges SIP signaling messages 4 with each endpoint according to Request For Comment (RFC) 3725, which is publicly available on the Internet Engineering Task Force (IETF) website. For example, the call controller 1 exchanges SIP signaling messages 4 with IP phone B to determine session information 5 for IP phone B, which is then provided to IP phone A. IP phone A then uses the contact information 5 to establish an IP media path 3 to IP phone B. After the media path 3 is established, IP phones A and B exchange media such as audio or video packets over the media path 3.

However, according to RFC 3725 operation, controller 1 requires that each endpoint understand SIP signaling messages. Plain Old Telephone System (POTS) phones, such as phone C located on the Publicly Switched Telephone Network (PSTN) 98, do not understand SIP. Therefore, third party call control according to RFC 3725 and the accompanying features, such as Click-to-Dial, cannot be used directly with these devices.

In other words, phones A and C can only communicate over an endpoint initiated call 6. Moreover, once the call 6 is initiated, third party call control features such as conferencing and operator services are unavailable for endpoints C. The disclosure that follows solves these and other problems.

SUMMARY OF THE INVENTION

In one embodiment, a gateway orchestrates a call between an IP device and a PSTN device. As a result, third party call control features such as Click-to-Dial together with various call features in operator services and conferencing service are available for the call with the PSTN device.

The foregoing and other objects, features and advantages of the invention will become more readily apparent from the following detailed description of a preferred embodiment of the invention that proceeds with reference to the accompanying drawings.

DETAILED DESCRIPTION

Figure 2:
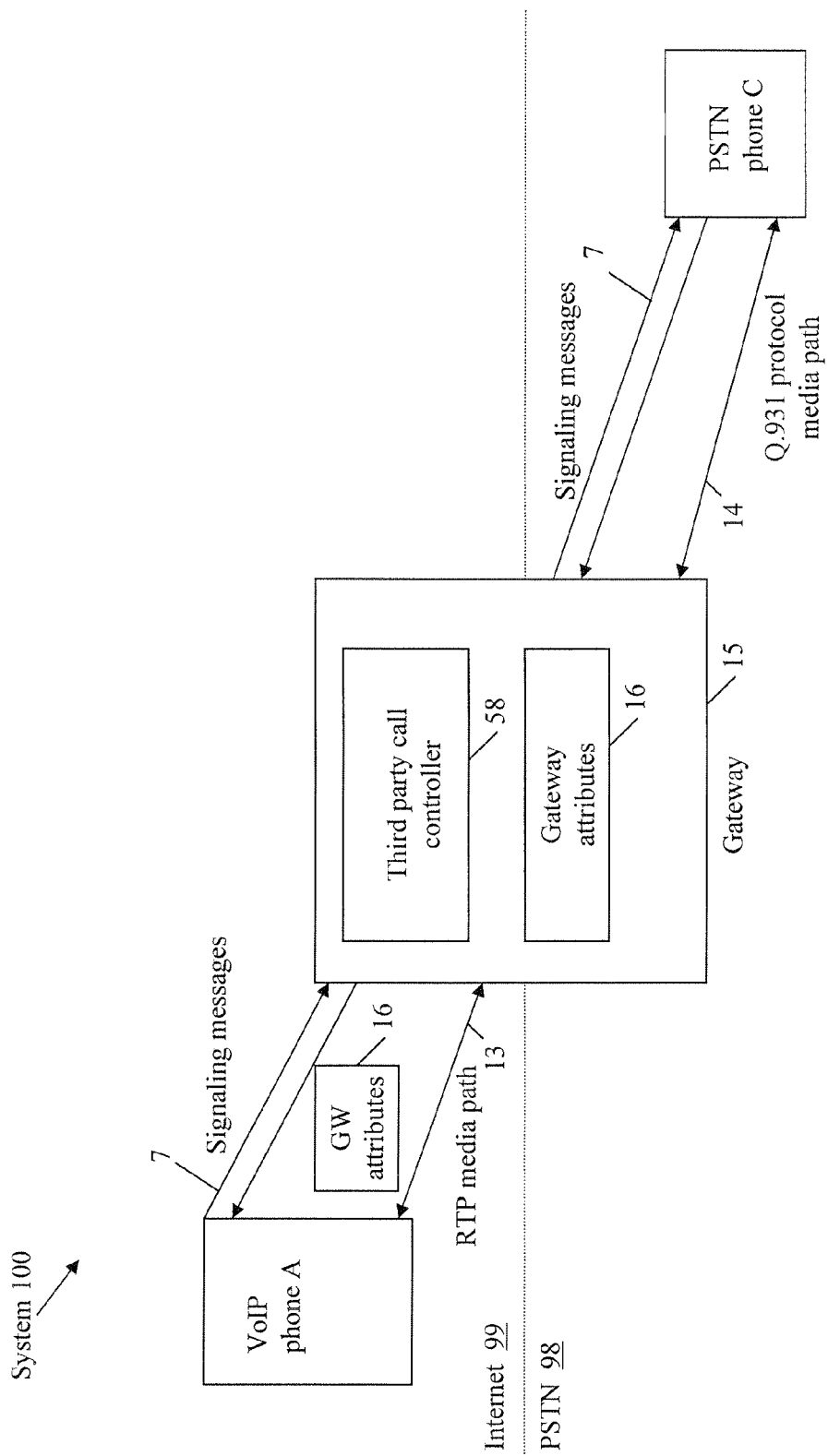
FIG. 2 is a diagram showing one embodiment of a system that provides third party call control for calls between an IP device and a PSTN device.

FIG. 2 is a diagram showing one embodiment of a system 100 that provides third party call control for calls with PSTN devices. Accordingly, the system 100 allows a Click-to-Dial initiated call to be setup with a Publicly Switched Telephone (PSTN) device such as a Plain Old Telephone System (POTS) phone.

Figure 1:
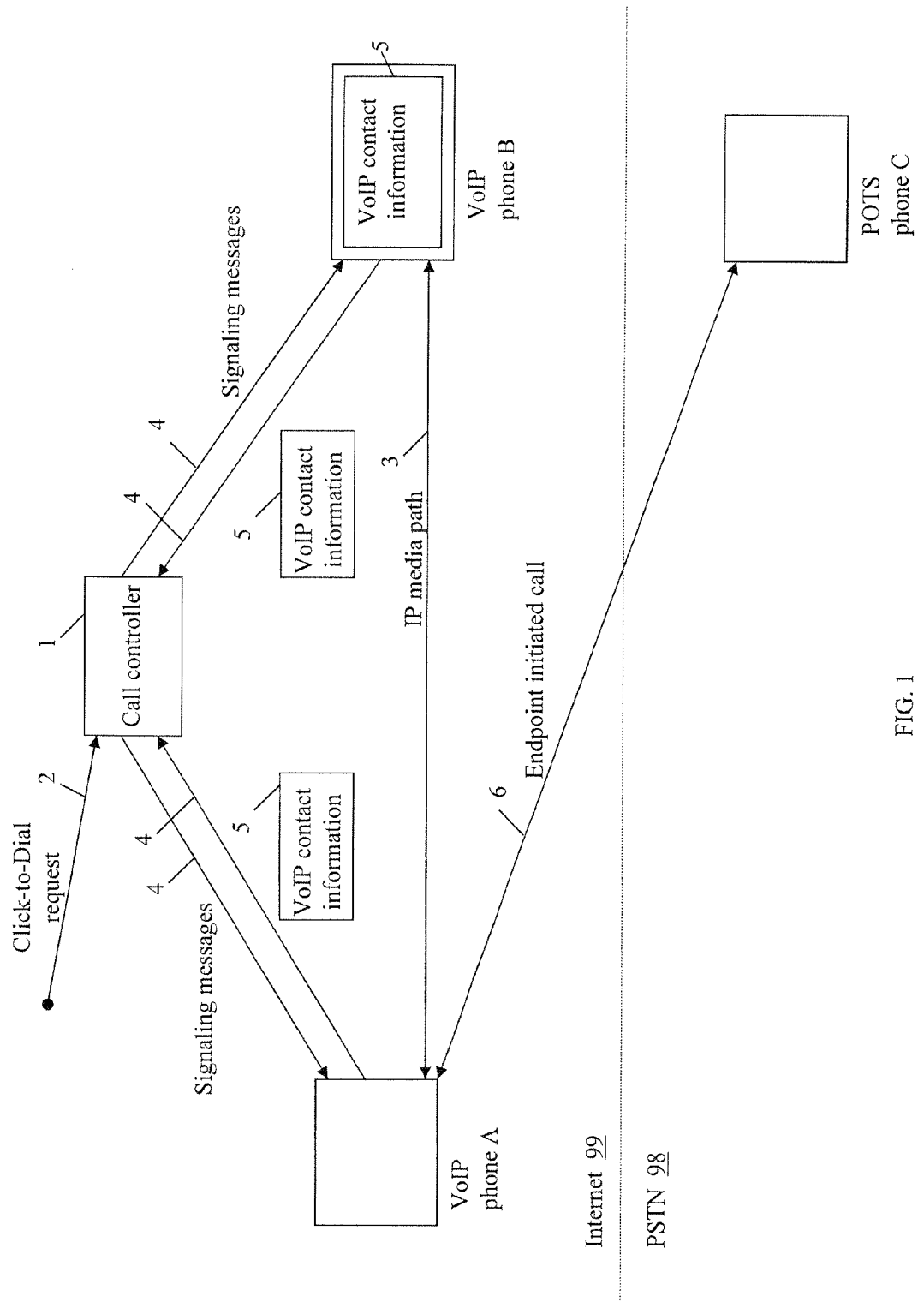
FIG. 1 is a diagram showing a third party call controller.

Several differences are immediately apparent when comparing FIGS. 1 and 2. First, a gateway 15 coupled between the Internet 99 and the PSTN 98 exchanges signaling messages 7 to initiate a third party call instead of the call controller located on the Internet 99 according to third party call controller 58. Second, different media paths 13 and 14 using different protocols are established between each endpoint and gateway 15 instead of a single media path being established directly between the two endpoints. Third, Internet Protocol (IP) phone A is provides attributes 16 for the gateway 15 instead of contact information for a called endpoint.

The system 100 allows greater functionality than the controller 1 shown in FIG. 1. For example, in contrast to the controller 1 shown in FIG. 1, the system 100 allows a user located anywhere on the Internet 99 to specify a PSTN device in a Click-to-Dial initiated phone call. Moreover, a third party can use the gateway 15 to provide third party controlled conferencing and operator services for the call flowing over media paths 13 and 14 unlike the prior art endpoint initiated call 6.

Figure 3:
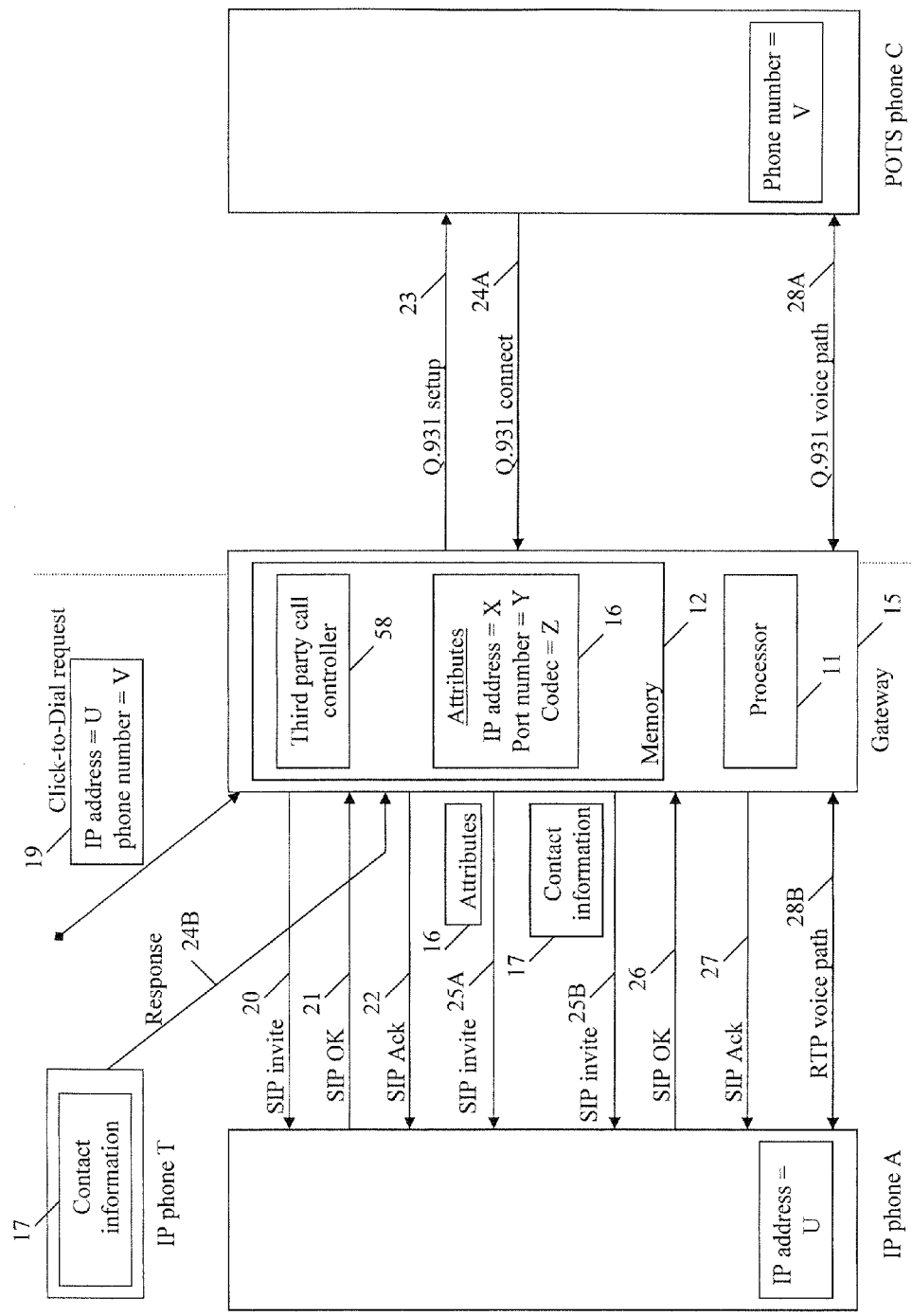
FIG. 3 is a detailed diagram showing one embodiment of a gateway that initiates a call between an IP device and a PSTN device.

FIG. 3 is a detailed diagram showing one embodiment of an Internet-PSTN gateway 15 that initiates a third party call between an IP device (e.g. IP phone A) and a PSTN device (e.g. POTS phone C). The gateway 15 includes a processor 11, a memory 12 and third party call initiation controller software 58. The controller software 58, when executed by the processor 11, performs the functions described in the flowcharts of FIG. 4. Of course other embodiments could also be used where a state machine or programming logic provides the functions described in FIG. 4.

Referring to FIG. 3, the gateway 15 provides multi-protocol communication with IP network devices using Session Initiation Protocol (SIP) and PSTN network devices using the Q.931 protocol. In other embodiments, the gateway 15 uses any other packet switched protocol to communicate with packet switched network devices and any other circuit switched network protocol to communicate with circuit switched network devices. Moreover, in other embodiments different networks besides the Internet 99 and the PSTN 98 may be used for establishing a third party controlled call using gateway 15.

The gateway 15 receives a Click-to-Dial request 19 specifying a third party controlled call between the IP phone A reachable at IP address U and the PSTN phone C reachable at phone number V. The Click-to-Dial request 19 may be generated when a person using a device located anywhere on the Internet 99 uses a webpage to specify a call between IP phone A and POTS phone C. In other embodiments, the request 19 uses other protocols associated with different or the same networks.

According to the controller 58, the gateway 15 proceeds to setup a third party controlled call between the endpoints specified in the request 19. The gateway 15 sends a SIP invite 20 causing IP phone A to ring. Next, IP phone A is answered and the gateway 15 receives back a SIP OK message 21 (which may also be referred to as a SIP 200 OK message 21.) In other embodiments, the invite 20 and the OK message 21 are sent using a different packet switched network protocol.

Next, to avoid any possible timeout problems created by waiting for communications with phone C, the gateway 15 immediately sends back a SIP acknowledge 22 as described with respect to call flow III illustrated in Request For Comment (RFC) 3725. RFC 3725 is herein incorporated by reference and publicly available on the Internet Engineering Task Force (IETF) website. The acknowledge 22 is a black hole Session Description Protocol (SDP) type with a connection address equal to 0.0.0.0 that initially prevents media from flowing from IP phone A to the gateway 15. Since the acknowledge 22 is a black hole type, a second acknowledge will be subsequently sent by gateway 15 after communicating with the other called party. Although the immediate black hole acknowledge 22 is preferred, other embodiments may exclude this and other signaling as explained in reference to the alternate call flow models I-IV described in RFC 3725.

Next, gateway 15 sends a Q.931 protocol setup message 23 to phone C. In other embodiments, the message 23 may be sent before or simultaneously with the SIP invite 20.

Although message 23 will generally elicit a Q.931 connect response 24A from POTS phone C, a different response 24B may be elicited due to supplementary services for phone C, such as Call Forward No Answer or Single Number Reach (SNR). For example, a user may have configured a Call Forward No Answer setting to associate phone C and IP phone T. The settings may further be set so that unanswered calls to phone C are directed to IP phone T. As a result, the message 23 may cause IP phone T to ring. Subsequently, IP phone T may be answered causing gateway 15 to receive response 24B instead of response 24A.

The gateway 15 determines whether a response is received over the PSTN 98 or the Internet 99. When Q.931 protocol connect message 24A is received over the PSTN 98 because a PSTN device (phone C) answered, a call path 28A over the PSTN 98 is completed between the gateway 15 and the phone C. Gateway 15 then sends SIP invite 25A to IP phone A. SIP invite 25A includes gateway attributes 16 such as an IP address X and a port number Y for the gateway 15. The attributes 16 may also include a codec Z used by the gateway 15.

When IP response 24B is received over the Internet 99 because an IP device answered (IP phone T), gateway 15 does not provide gateway attributes 16 to IP phone A. Instead, the gateway 15 sends SIP invite 25B including contact information 17 for the answering device, IP phone T.

Next, regardless of which of the SIP invites 25A or 25B are sent, gateway 15 receives back a second SIP OK 26 and in turn sends a second SIP acknowledge 27 that is not a black hole type. Other embodiments may exclude the second acknowledge 27 as described in RFC 3725 call flow models I-IV.

When IP phone A receives the gateway attributes 16, IP phone A then establishes a voice path 28B with gateway 15, which may operate according to the Real-time Transport Protocol (RTP). The two call paths 28A and 28B then allow IP phone A and POTS phone C to exchange media through Gateway 15 as a result of the Click-to-Dial request 19 that specified a PSTN device.

When IP phone A receives the contact information 17, IP phone A then uses the received contact information 17 to establish a call path (not shown) directly with IP phone T. The call path allows IP phone A and IP phone T to then exchange media as a result of the Click-to-Dial request 19 that specified a PSTN device.

Although the illustrated embodiment shows the gateway 15 initiating a third party call with the POTS phone C, other embodiments include a multi-protocol gateway that provides third party call control and Click-to-Dial support for calls to different types of network devices. For example, other embodiments of the gateway 15 initiate third party calls with any of a Skinny Client Control Protocol (SCCP) endpoint, an H232 trunk, a PSTN trunk, any PSTN device or any IP device. Thus, other embodiments of the gateway 15 orchestrate third party controlled calls between SIP capable devices and any of these network devices.

In summary, the gateway 15 allows a third party controlled call to be established with a network device independently of whether the network device is SIP capable. Advantageously, this allows a call to be initiated with a PSTN device in response to a Click-to-Dial request. The third party call may then be managed by the gateway 15 so that various call features may be provided for the call. Moreover, the gateway 15 advantageously provides for the contingency that occurs when a PSTN device is specified in the call request but the answering device is an IP device, or visa versa.

Figure 4:
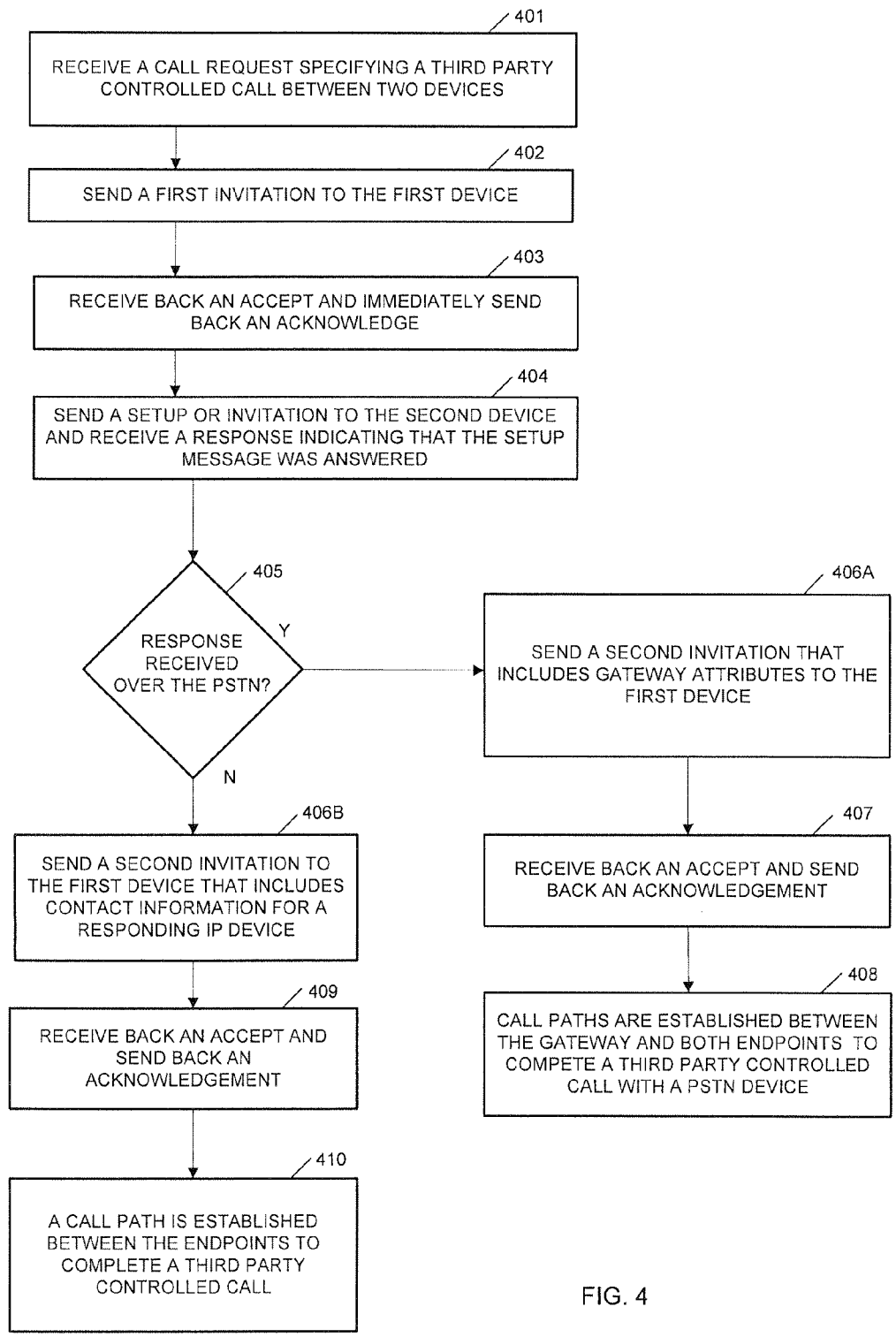
FIG. 4 is a flowchart showing how the gateway in FIG. 3 provides third party call control.

FIG. 4 is a flowchart showing how the gateway 15 in FIG. 3 provides third party call control. In block 401, the gateway 15 receives a call request such as a Click-to-Dial request specifying a third party controlled call between two devices. Next, in block 402 the gateway 15 sends a first invitation to the first device using SIP or any other protocol. The gateway 15 receives back an accept message and immediately sends back an acknowledge in block 403.

In block 404, the gateway 15 sends a setup message or other invitation to the second device using Q.931, SIP or any other protocol, which elicits a response. In block 405, the gateway 15 determines whether the response is received over the PSTN.

When the determination indicates that the response is received over the PSTN in block 405, the gateway 15 in block 406A sends a second invitation that includes gateway attributes to the first device. The gateway 15 receives back an accept message and in turn sends an acknowledgement in block 407. In block 408, call paths are established between the gateway 15 and both endpoints to complete a third party controlled call with the responding PSTN device.

When the determination indicates that the response is not received over the PSTN, in block 406B the gateway 15 sends a second invitation to the first device that includes contact information for a responding IP device. In block 409, the gateway 15 receives an accept message and in turn sends back an acknowledgement. In block 410, a call path is established directly between endpoints to complete a third party controlled call.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A gateway, comprising:
   a circuit switched network interface to communicate with a circuit switched network;
   an Internet Protocol (IP) network interface to communicate with an IP network;
   a processor configured to send a first call invitation to an IP network device over the IP network interface, wherein the first call invitation is unsolicited with respect to a target thereof;
   the processor configured to send a second call invitation to a circuit switched network device over the circuit switched network interface, wherein the second call invitation is unsolicited with respect to a target thereof; and
   the processor configured to determine whether a response to the second call invitation is received over the circuit switched network interface or the IP network interface, to send a gateway address to the IP network device over the IP network interface if the response is received over the circuit switched network interface, to send contact information to the IP network device over the IP network interface if the response is received over the IP network interface;
   wherein if the contact information is sent over the IP network interface, the processor is configured to initiate a call between the IP network device and a remote device located in the IP network; and
   wherein if the gateway address is sent over the IP network interface, the processor is configured to initiate a call between the IP network device and the circuit switched network device.

2. The gateway of claim 1, wherein the processor is configured to send an acknowledge over the IP network interface including an IP address equal to 0.0.0.0 immediately after receiving a response to the first call invitation.

3. The gateway of claim 1, wherein the processor is configured to generate and send the first and second call invitations responsive to receiving a call request from a third endpoint that is separate from the targets of the first and second call invitations.

4. The gateway of claim 1, wherein the gateway initiates a third party controlled call between the IP network device and the circuit switched network device over a call path extending through the gateway in response to a call request.

5. The gateway of claim 4, wherein the call request is received over the IP network interface and is generated by an IP device that operates independently of the called endpoints.

6. The gateway of claim 1, wherein the processor is configured to determine whether the response to the second call invitation is received over the circuit switched network interface or the IP network interface, to send a message indicating a codec used by the gateway over the IP network interface if the response is received over the circuit switched network interface.

7. A method, comprising:
   sending a first call invitation to an IP network device over an Internet Protocol (IP) network interface of a gateway, wherein the first call invitation is unsolicited with respect to a target thereof;
   sending a second call invitation to a circuit switched network device over a circuit switched network interface of the gateway, wherein the second call invitation is unsolicited with respect to a target thereof; and
   determining whether a response to the second call invitation is received over the circuit switched network interface or the IP network interface; and
   if the response is received over the circuit switched network interface, sending a gateway address to the IP network device over the IP network interface, and if the response is received over the IP network interface, sending contact information to the IP network device over the IP network interface, wherein:
   if the contact information is sent over the IP network interface, the gateway initiates a call between the IP network device and a remote device located in an IP network; and
   if the gateway address is sent over the IP network interface, the gateway initiates a call between the IP network device and the circuit switched network device.

8. The method of claim 7, wherein the gateway address or the contact information is sent in a third invitation, and wherein the gateway sends two call invitations to a same endpoint.

9. The method of claim 8, further comprising sending the third invitation to a same destination as the first call invitation after receiving an acceptance message corresponding to the first call invitation.

10. The method of claim 9, further comprising including an invalid connection address in association with the first invitation.

11. The method of claim 10, further comprising providing valid connection addresses in association with the second and third invitations.

12. The method of claim 7, wherein the contact information is an IP address of an endpoint reachable over the IP network interface.

13. The method of claim 7, further comprising receiving a call request on the IP network interface, and sending the call invitations based on the call request.

14. The method of claim 13, wherein the call request is a Click-to-Dial request.

15. The method of claim 14, wherein the call is established between first and second endpoints, and wherein the call request originates from a third endpoint.

* * * * *